J. E. NICHOLS.
AUTOMOBILE SIGNAL.
APPLICATION FILED AUG. 18, 1919.
1,360,141.
Patented Nov. 23, 1920.
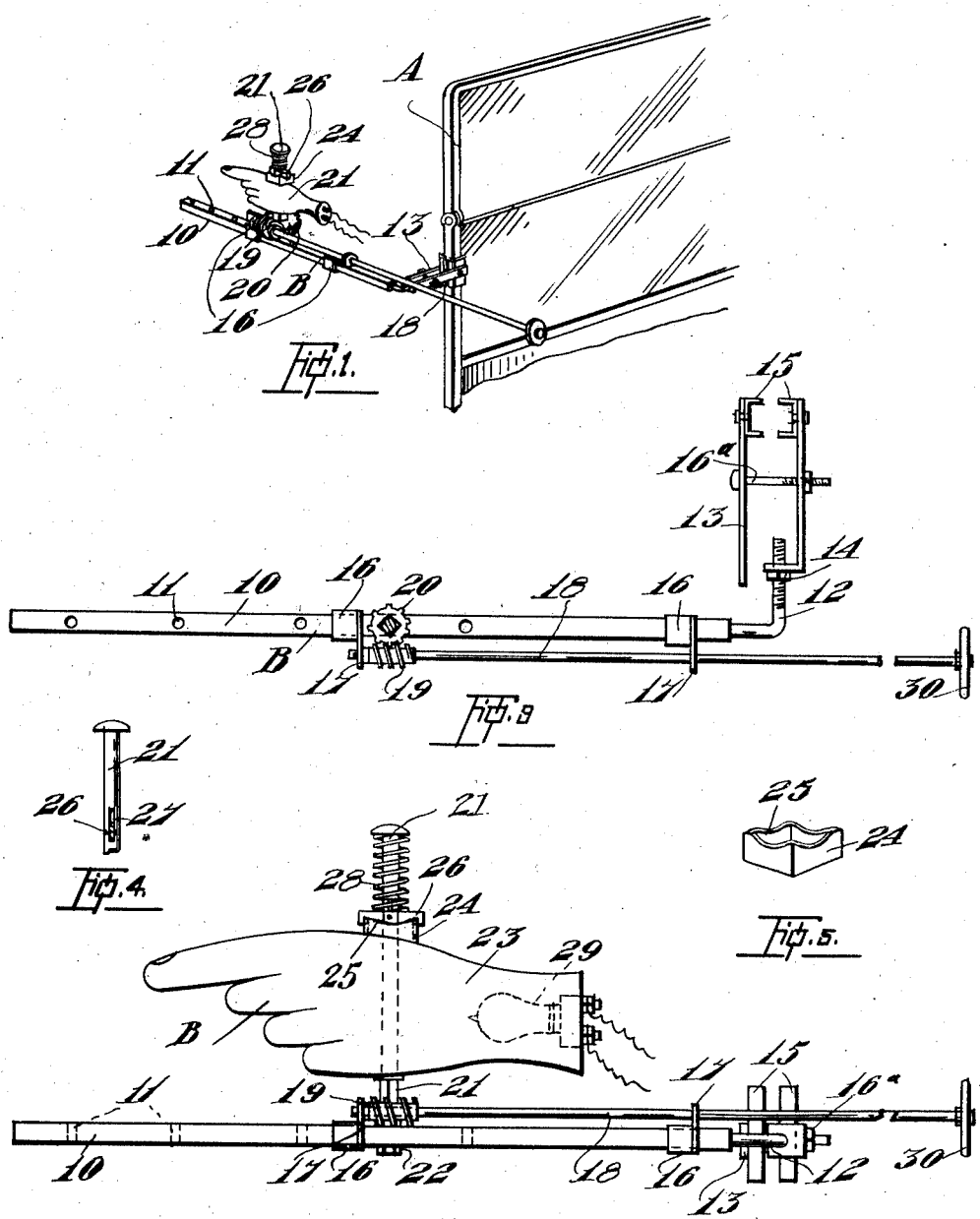
INVENTOR
JOHN E. NICHOLS

UNITED STATES PATENT OFFICE.

JOHN ELMER NICHOLS, OF EDMONTON, ALBERTA, CANADA.

AUTOMOBILE-SIGNAL.

1,360,141.  Specification of Letters Patent.  Patented Nov. 23, 1920.

Application filed August 18, 1919. Serial No. 318,392.

*To all whom it may concern:*

Be it known that I, JOHN ELMER NICHOLS, a subject of the King of Great Britain, and resident of the city of Edmonton, in the Province of Alberta, Dominion of Canada, have invented certain new and useful Improvements in Automobile-Signals, of which the following is a specification.

This invention relates to improvements in automobile signals.

The present practice when driving an automobile is for the chauffeur or driver to extend his arm at the side of the automobile indicating to the traffic officer in which direction he intends to travel, whether taking a turn to the right or left. But in the event of the automobile going straight forward he indicates the direction of travel by extending his arm straight in front of him. This procedure necessarily causes the chauffeur or driver of the automobile to release his grip on the hand wheel or other controls so that only one hand is free to be used in manipulating the steering wheel and other levers of the automobile at that particular moment. This is a considerable drawback and according to my invention provision is made for indicating to the traffic officer the direction of travel of the automobile and the means which I employ are capable of being used not only in daytime but also at nighttime. In the older system the means of indicating by the arm the direction of travel of the automobile could only be advantageously utilized in the daytime and at night some other system of signaling was necessary so that when an automobile was approaching a crossing or street corner it was necessary to materially reduce the speed so that a proper indication might be given to the traffic officer of the intended course the automobile was about to travel in.

Again by the present invention this improved method of signaling can be readily mounted on automobiles at present in use no matter what the make of the automobile is and the several parts of the device are readily accessible for inspection and repair and are capable of quick adjustment to suit the circumstances under which they are being operated.

With the above and other objects in view the invention consists essentially of the improved construction hereinafter described and set forth in detail in the following specification and accompanying drawings forming part of the same.

In the drawings:

Figure 1 is a fragmentary perspective view of the wind shield of an automobile showing the improved indicator mounted thereon.

Fig. 2 is an enlarged side elevation of the improved indicator.

Fig. 3 is a plan view of the indicator the hand being removed.

Fig. 4 is a side elevation of the pin broken away which is utilized for holding the indicating hand in position.

Fig. 5 is a perspective view of the locking plate or washer designed to maintain the indicating hand in adjusted position.

Like characters of reference refer to like parts in the several figures.

Referring to the drawings, A represents an automobile wind shield of any usual description and B the improved indicator adjustably mounted thereon. This indicator comprises a rod 10 which is formed square for the greater part of its length and is provided with a pair of orifices 11 extending vertically therethrough, one end of the rod being reduced and formed with an offset threaded end 12 designed to make threaded engagement with one member of the clamp 13 by means of which the indicator is secured to the frame of the wind shield A. The clamp 13 comprises two side members, one of which is of angle-shape and makes threaded engagement with the threaded end 12 of the rod 10 and this member is held in the desired adjusted position by means of a lock nut 14.

On the end members of the clamp 13 remote from the rod 10 a pair of U-shaped members 15 are rigidly secured which embrace the frame of the wind shield A and the two members of the clamp are secured in position by means of a bolt 16 provided with a suitable thumb nut, thereby facilitating positioning or removing the indicator on the wind shield.

Slidably mounted on the squared portion of the rod 10 are a pair of brackets 16 provided with upwardly extending arms 17 formed of resilient metal and designed to form bearings for the rod 18 which is provided on the front end with a worm 19 adapted to mesh with a worm wheel 20 mounted on the squared lower end of the bolt 21 which passes through one of the orifices 11 in the rod 10 and is secured in position by lock nuts 22. The bolt 21 carries a transparent, hollow hand 23 suitably mounted thereon, the said hand having a washer 24 on the upper face, the washer being of box formation having depressions 25 in the opposite edges and with these depressions a cotter 26, which passes through the bolt 21, is designed to engage. This cotter is adjustably mounted in a cotter hole 27 and the upper edge of the cotter is engaged by a spiral spring 28 which embraces the upper end of the bolt 21 and is located between the head of the bolt and the said cotter. In the transparent hand an electric light 29 is suitably mounted and connected with a source of electrical supply, and the rod 18 is provided with a hand wheel 30, the object of which will be made clear hereafter.

When this device is in use it is mounted on the wind shield or other part of the frame of the automobile which is most suitable for the reception of such a device and the clamp 13 is tightened so that the rod 10 will be held rigidly in position against lateral or vertical motion.

The bearings 16 are now adjusted in position and the bolt 21 engaged with one of the orifices 11, in which position the worm wheel 20 meshes with the worm 19 and the rod 18, which extends rearwardly to a point adjacent to the driver's seat, will be of such a length that the hand wheel 30 is convenient to the driver of the automobile.

When the automobile is approaching a corner the hand wheel 13 is rotated so that motion is transmitted to the bolt 21 and the hand 23 will then point in the direction in which the automobile intends to travel. The hand is held in this adjusted position by means of the cotter 26 engaging with the depressions 25 in the washer 24 and any jarring of the automobile will not displace the hand. It will be seen that when actually taking the corner the driver will have both hands free to manipulate his controls and his steering wheel and after taking the corner he then releases the hand wheel 30 to bring the indicating hand 23 back into a position to indicate the course of travel.

When this device is in use at night time the lamp 29 will be lit so that the indicating hand 23 is illuminated and always discernible to a traffic officer or to pedestrians or other traffic on the road.

From this description it will be seen that I have invented an automobile indicator which can be advantageously utilized on automobiles at present in use and which can be adjusted in position with a minimum of time and labor and whereby the traffic officer, pedestrians and other traffic will be quickly notified of the desired road of travel of the automobile.

As many changes could be made in the above construction, and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

An indicator of the class described, comprising a clamping member, a rod extending from the clamping member squared in cross section for the major part of its length and provided with orifices therethrough, a bolt engaging with one of the orifices, a gear on the bolt, a transparent indicating member on the bolt, a washer having depressions on the upper edge, a cotter engaging the bolt and coacting with the depressions, resilient means for holding the cotter in engagement with the depressions, a rod, a worm on the rod coacting with the gear, and means for actuating the rod.

In witness whereof I have hereunto set my hand in the presence of two witnesses.

JOHN ELMER NICHOLS.

Witnesses:
J. F. LYNBURN,
R. M. CHITALD.